United States Patent [19]

Adams et al.

[11] Patent Number: 5,796,403
[45] Date of Patent: Aug. 18, 1998

[54] METHOD OF DISPLAY CATEGORIZATION IN A MULTI-WINDOW DISPLAY

[76] Inventors: James S. Adams, 509 E. Utopia Rd., Phoenix, Maricopa County, Ariz. 85024; Donald W. Moore, 2901 E. Friess Dr., Phoenix, Maricopa County, Ariz. 85032; James C. Huntington, 6141 N. 16th Dr., Phoenix, Maricopa County, Ariz. 85015; Richard C. Holland, 4425 E. Monte Cristo Ave., Phoenix, Maricopa County, Ariz. 85032

[21] Appl. No.: 720,347

[22] Filed: Sep. 27, 1996

[51] Int. Cl.⁶ ............................................. G06F 3/00
[52] U.S. Cl. ............................................. 345/343
[58] Field of Search ........................ 395/343, 342, 395/333, 334, 340–347; 345/340, 343

[56] References Cited

U.S. PATENT DOCUMENTS

| | | | |
|---|---|---|---|
| 4,574,364 | 3/1986 | Tabata et al. | 345/343 |
| 4,794,386 | 12/1988 | Bedrij et al. | 345/340 |
| 5,060,170 | 10/1991 | Bourgeois et al. | 345/342 |
| 5,091,866 | 2/1992 | Takagi | 345/343 |
| 5,390,295 | 2/1995 | Bates | 345/342 |
| 5,487,143 | 1/1996 | Southgate | 345/342 |

*Primary Examiner*—A. Katbab
*Attorney, Agent, or Firm*—Arthur A. Sapelli; Anthony Miologos

[57] ABSTRACT

A method of controlling a computer window display of a display system having a display surface of one or more physical screens, provides an integrated workspace wherein multiple applications are displayed, by category, in a coordinated, predetermined area of the display surface. In response to a request inputted to the display system, the requested application display is created. A category of the requested display is ascertained. A lookup is performed in a configuration file to find a match between the category of the requested display and an entry in the configuration file. When a match of categories is found, the display characteristic data is obtained to get the position and size of the display. A pointer points to the next available area of the display area for the category of interest, and the display is created to be positioned within the selected available window.

4 Claims, 11 Drawing Sheets

| FILE NAME : XYZ |
|---|
| TEMP ALARM b1<br><br>OVF ALARM b2 |
| LOCATION OF DATE<br>FOR b1<br><br>LOCATION OF DATE<br>FOR b2 |
| CATEGORY: ALM |

Fig. 8

CONFIGURATION FILE

FIRST MATCH GROUP

GROUP — ROUND ROBIN(RR)
    MATCH — ALARM (ALM)

P1 ⟶   ALARM1 — (DATA)
        ALARM2 — (DATA)

GROUP — RR
    MATCH — TREND (TR)

P2 ⟶   TR1 (DATA)
        TR2 (DATA)
        TR3 (DATA)
        TR4 (DATA)

GROUP — RR
    MATCH — SCEMATIC (SCM)

SCM1 (DATA)
        SCM2 (DATA)
P3 ⟶   SCM3 (DATA)
        SCM4 (DATA)

*Fig. 10*

METHOD OF DISPLAY CATEGORIZATION IN A MULTI-WINDOW DISPLAY

RELATED APPLICATIONS

The present application is related to the following:

1. Patent application, Ser. No. 08/720,340, entitled "A Method for Configuring and Controlling Computer Windows'Display of Multiple Applications";

2. Patent application, Ser. No. 08/720,349, entitled "A Method for Re-Invoking Previously Displayed Software Application Displays in a Multi-Window Environment";

3. Patent application, Ser. No. 08/720,345, entitled "A Method for Constraining the Number of Displays in a Multi-Window Computer Environment";

4. Patent application, Ser. No. 08/720,346, entitled "A Method for Constraining the Available Display Surface in which Application Displays May be Rendered";

5. Patent application, Ser. No. 08/720,348, entitled "A Method for Configuring the Display Properties to be Applied to Predetermined Application Displays"; and 6. Patent application, Ser. No. 08/720,364, entitled "A Method for Controlling the Presentation of Displays in a Multi-Window Computer Environment";

all of the above being incorporated by reference herein, and all of the above filed on even date herewith, and all of the above assigned to Honeywell Inc., the assignee of the present application.

BACKGROUND OF INVENTION

The present invention relates to a display system, and more particularly, to a method for organizing software application displays by categories, enabling subsequent management of these displays based on the category.

Existing multi-window computer display environments do not differentiate, with respect to display content, between the different application displays presented therein. This lack of content-oriented differentiation between displays inhibits the ability for a potential automated window management system to provide display placement and management support for specific displays and kinds of displays.

The present invention provides a method for differentiating between various application displays such that an automated window management system can provide specialized support for different categorizations of displays. This support includes control over several important display characteristics, including position, size, move-ability, displayable region, etc. This content-oriented window differentiation and organization method provides the means for an automated window management system to "intelligently disposition" various actual displays according to the content-oriented categorizations associated with those displays. The present invention has applicability for use with any system which supports multiple, simultaneous displays for which a level of content-based organization (placement, size, etc.,) of these displays would enhance the human operator's ability to perform his or her tasks. A specific example is the oil refinery operator in the operational control center, viewing a large screen which contains various kinds of displays. The present invention provides the mechanism to differentiate between critical displays so that operational process upsets can be avoided. The present invention thus provides improved control and predictability over the dispositioning (placement, sizing, subsequent control) of displays based upon content oriented categorizations of these displays. Automatic organization of multiple applications based on common and custom display characteristics affords intelligent differentiation of displays based upon these characteristics.

SUMMARY OF THE INVENTION

Therefore, there is provided by the present invention a method for organizing software application displays by categories to provide subsequent management of these displays. A method of controlling a computer window display of a display system having a display surface of one or more physical screens, provides an integrated workspace wherein multiple applications are displayed, by category, in a coordinated, predetermined area of the display surface. In response to a request inputted to the display surface, the requested application display is created. A category of the requested display is ascertained. A lookup is performed in a configuration file to find a match between the category of the requested display an entry in the configuration file. When a match of categories is found, the display characteristics data is obtained to get the position and size of the display, along with other display characteristics data. A pointer points to the next available area of the display area for the category of interest, and the requested display is created to be positioned within the selected available window.

Accordingly, it is an object of the present invention to provide a method for organizing software application displays.

It is another object of the present invention to provide a method for organizing software application displays by categories, including other identification approaches, such as title, path name, . . .

It is still another object of the present invention to provide a method for differentiating between various application displays such that an automated window management system can provide specific support for different categorizations of displays.

These and other objects of the present invention will become more apparent when taken in conjunction with the following description and attached drawings, wherein like characters indicate like parts, and which drawings form a part of the present application.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 7, which comprises

FIG. 8 shows an example of an alarm display file;

FIG. 10 shows an example of a configuration file used in the example as described herein.

DETAILED DESCRIPTION

Figure 1:
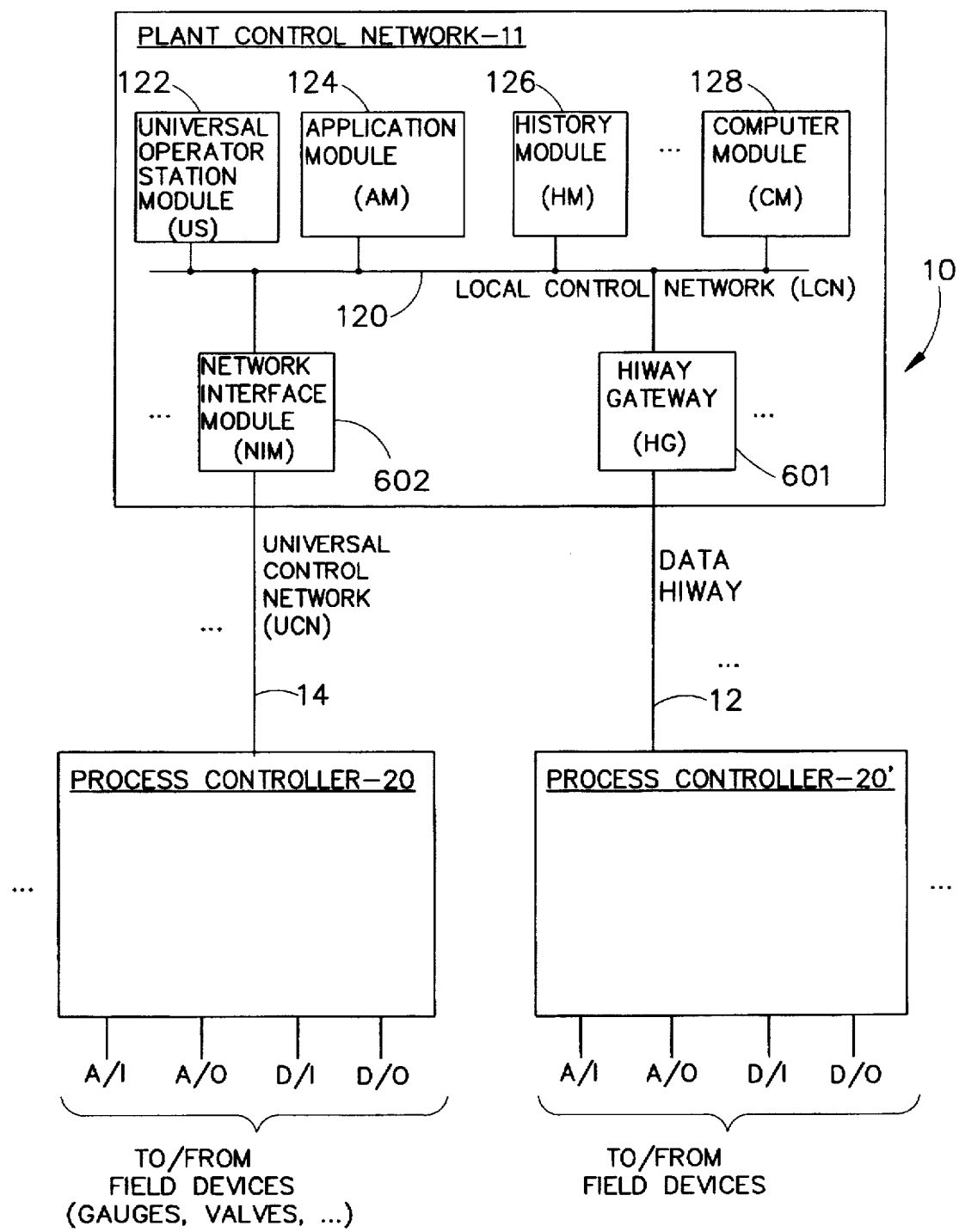
FIG. 1 shows a block diagram of a process control system of the preferred embodiment in which the present invention can be utilized.

Before describing the method of the present invention, it will be helpful in understanding a system environment in which the invention is utilized. Referring to FIG. 1, there is shown a block diagram of a process control system 10 of the preferred embodiment in which the present invention can be found. The process control system 10 includes a plant control network 11, and connected thereto is a data hi way 12, which permits a process controller 20' to be connected thereto. In the present day process control system 10, additional process controllers 20' can be operatively connected to the plant control network 11 via a corresponding hi way gateway 601 and a corresponding data hi way 12. A process controller 20, an interface apparatus which includes many new additions, improvements, and features over the process controller 20', is operatively connected to the plant control network 11 via a universal control network (UCN) 14 to a network interface module (NIM) 602. In the preferred embodiment of the process control system 10 additional process controllers 20 can be operatively connected to the plant control network 11 via a corresponding UCN 14 and a corresponding NIM 602. The process controllers 20, 20' interface the analog input and output signals and digital input and output signals (A/I, A/O, D/I, and D/O respectively) to the process control system 10 from the variety of field devices (not shown) of the process being controlled which include valves, pressure switches, pressure gauges, thermocouples, . . . .

The plant control network (or more simply network) 11 provides the overall supervision of the controlled process in conjunction with the plant operator and obtains all the information needed to perform the supervisory function and includes an interface with the operator. The plant control network 11 includes a plurality of physical modules (or nodes), which include a universal operator station (US) 122, an application module (AM) 124, a history module (HM) 126, a computer module (CM) 128, and duplicates (backup or secondary) of these modules (and additional types of modules, not shown) as necessary to perform the required control/supervisory function of the process being controlled. Each of these physical modules is operatively connected to a local control network (LCN) 120, which permits each of these modules to communicate with each other as necessary. The NIM 602 and HG 601 provide an interface between the LCN 120 and the UCN 14 and the LCN 120 and the data hi way 12, respectively.

Physical modules 122, 124, 126, 128, . . . of network 11 of the preferred embodiment are of various specialized functional types. Each physical module is the peer, or equivalent, of the other in terms of right of access to the network's communication medium, or LCN 120, for the purpose of transmitting data to other physical modules of network 11.

Universal operator station module (US) 122 of network 11 is a workstation for one or more plant operators.

A history module (HM) 126 provides mass data storage capability. The history module 126 includes at least one conventional disk mass storage device, such as a Winchester disk, which disk storage device provides a large volume of nonvolatile storage capability for binary data. The types of data stored by such a mass storage device are typically trend histories, event histories, . . . or data from which such histories can be determined, data that constitutes or forms CRT type displays, copies of programs for the physical modules. . . .

An application module (AM) 124 provides additional data processing capability in support of the process control functions performed by the controllers associated with the process control subsystem 20, 20' such as data acquisition, alarming, batch history collection, and provide continuous control computational facilities when needed. The data processing capability of the application module 124 is provided by a processor (not shown) and a memory (not shown) associated with the module.

Computer module (CM) 128 uses the standard or common units of all physical modules to permit a medium-to-large scale, general purpose data processing system to communicate with other physical modules of network 11 and the units of such modules over the LCN 120 and the units of process control subsystems 20, 20' via the hi way gateway module 601, and the NIA4 602, respectively. Data processing systems of a computer module 128 are used to provide supervisory, optimization, generalized user program preparation, and execution of such programs in higher-level level program languages. Typically, the data processing systems of a computer module 128 have the capability of communicating with other such systems by a communication processor and communication fines.

The local control network 120 (LCN) is a high-speed, bit serial, dual redundant communication network that interconnects all the physical modules of plant control network 11. LCN 120 provides the only data transfer path between the principal sources of data, such as hi way gateway module 601, application module 124, and history module 126, and principal users of such data, such as universal operator station module 122, computer module 128, and application module 124. LCN 120 also provides the communication medium over which large blocks of data, such as memory images, can be moved from one physical module, such as history module 126, to universal station module 122. LCN 120 is dual redundant in that it consists of two coaxial cables that permit the serial transmission of binary signals over both cables.

Figure 2:
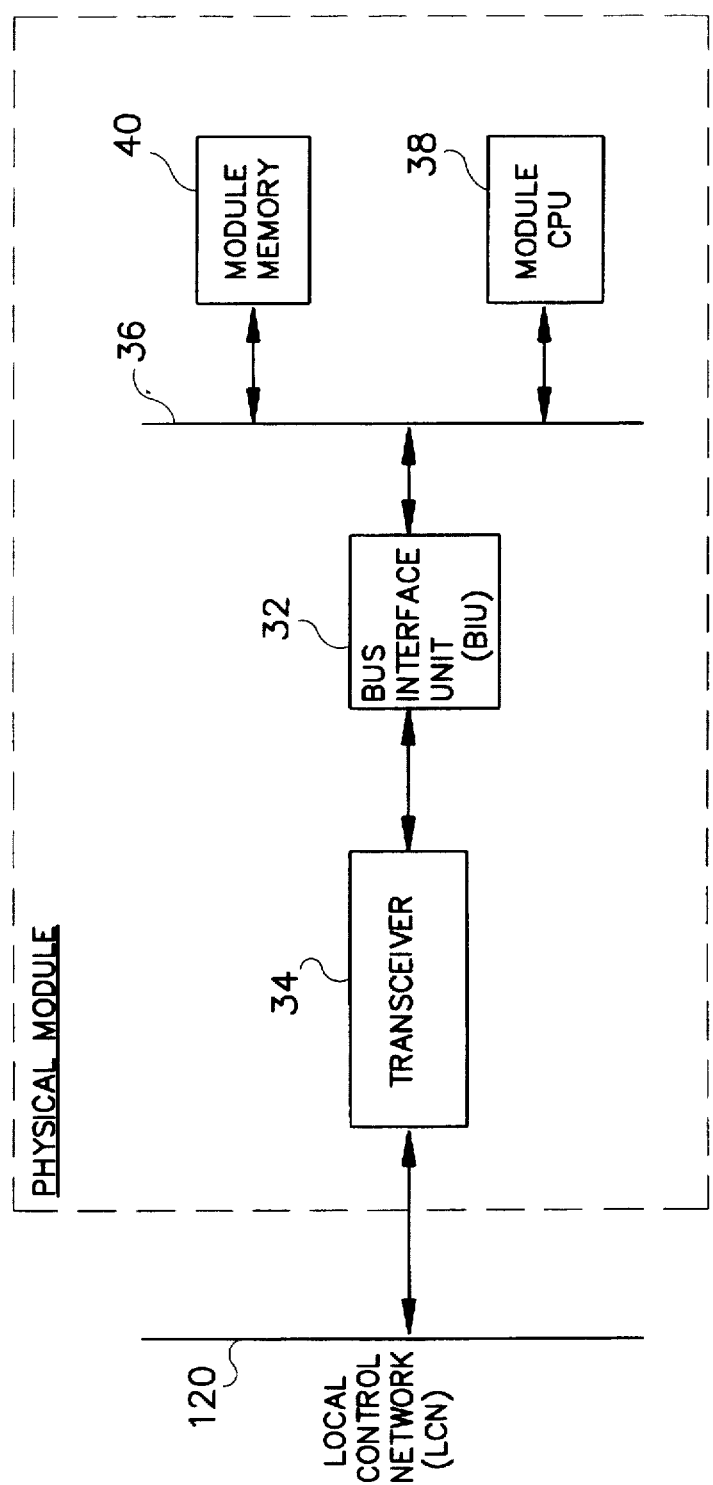
FIG. 2 shows a block diagram of common elements of each physical module of the process control system of FIG. 1.

Referring to FIG. 2, there is shown a block diagram of the common elements of each physical module of the network 11 or the process control system 10. Each of the physical modules includes a module central processor unit 38 and a module memory 40, a random-access memory (not shown), and such additional controller devices, or units (not shown), which are configured to provide the desired functionality of that type of module, i.e., that of the operator station 122, for example. The data-processing capabilities of each module's CPU 38 and module memory 40 create a distributed processing environment which provides for improved reliability and performance of network 11 and process control system 10. The reliability of network 11 and system 10 is improved because, if one physical module of network 11 fails, the other physical modules will remain operational. As a result, network 11 as a whole is not disabled by such an occurrence as would be the case in centralized systems. Performance is improved by this distributed environment in that throughput and fast operator response times result from the increase computer processing resources and the concurrency and parallelism of the data-processing capabilities of the system.

As mentioned above, each physical module includes the BUS interface unit (BIU) 32, which is connected to the LCN 120 by the transceiver 34. Each physical module is also provided with the module BUS 36 which, in the preferred embodiment, is capable of transmitting 16 bits of data in parallel between the module CPU 38 and the module memory 40. Other units, utilized to tailor each type of physical module to satisfy its functional requirements, are operatively connected to module BUS 36 so that each such unit can communicate with the other units of the physical module via its module BUS 36. The BIU 32 of the physical module initiates the transmission of data over LCN 120. In the preferred embodiment, all transmissions by a BIU 32 are transmitted over the coaxial cables which, in the preferred embodiment, form the LCN 120.

Figure 3:
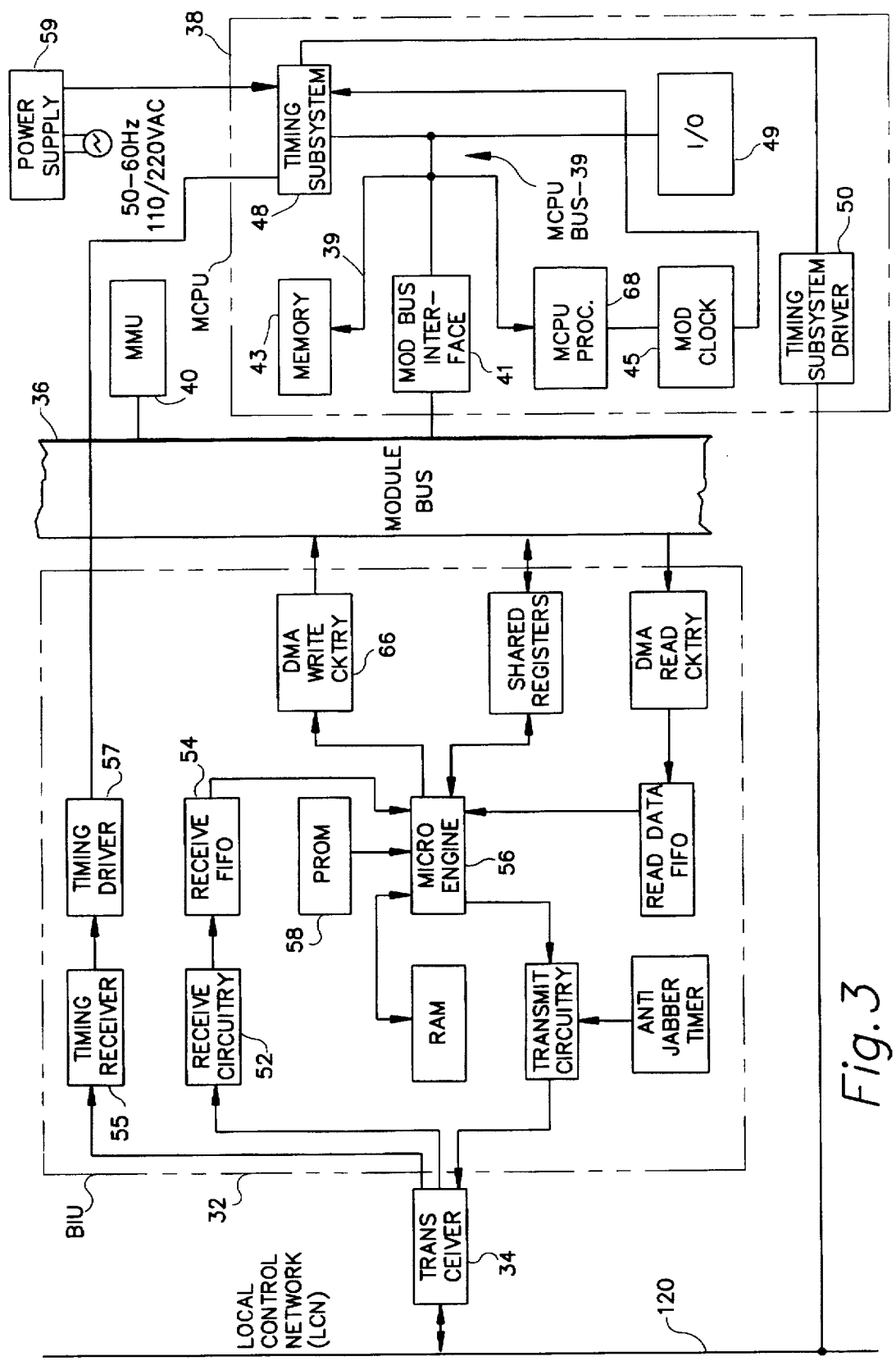
FIG. 3 shows a functional block diagram of a typical physical module of the process control system.

Referring to FIG. 3 there is shown a functional block diagram of a typical physical module 122, 124, 126, 128 of the plant control network 11, and includes the BUS 32 and the transceiver 34, which connects BIU 32 to the LCN 120. BIU 32 is capable of transmitting binary data over LCN 120 and of receiving data from LCN 120. Transceiver 34, in the preferred embodiment, is transformer coupled to the LCN 120. In the preferred embodiment, the LCN 120 is a dually-redundant coaxial cable with the capability of transmitting bit serial data. BIU 32 is provided with a very fast micro-engine 56. In the preferred embodiment, micro engine 56 is made up of bit slice components so that it can process eight bits in parallel and can execute a 24 bit microinstruction from its programmable read only memory (PROM) 58.

Signals received from the LCN 120 are transmitted by transceiver 34 and receive circuitry 52 to receive FIFO register 54. Micro engine 56 examines the data stored in FIFO register 54 and determines if the information is addressed to the physical module. If the data is an information frame, the received data is transferred by direct memory access (DMA) write circuitry 66 by conventional direct memory access techniques to the physical module memory unit (MMU) 40 over module BUS 36.

Communication between MCPU processor 68, a Motorola 68020 microprocessor in the preferred embodiment, and other functional elements of MCPU 38 is via local microprocessor BUS 39. Module BUS interface element 41 provides the communication link between local BUS 39 and module BUS 36. Processor 68 executes instructions fetched from either its local memory 43, in the preferred embodiment an EPROM, or from MMU 40. Processor 68 has a crystal controlled clock 45 which produces clock pulses, or timing signals. Input/output (I/O) port 49 provides communication between MCPU 38 and equipment external to the physical module to permit program loading and the diagnosis of errors, or faults, for example.

Each MCPU 38 includes a timing subsystem 48 which, in response to clock signals from module clock 45, produces fine resolution, synchronization, and real-time, timing signals. Any timing subsystem 48, which is provided with a timing subsystem driver 50, has the capability of transmitting timing information to other physical modules over the LCN 120. Another input to each timing subsystem 48 is timing information which is transmitted over LCN 120 and which is received through transceiver 34, timing receiver 55, and timing driver 57 of BIU 32. Timing pulses from module power supply 59, which are a function of the frequency of the external source of A.C. electric power applied to power supply 59, are used by timing subsystem 48 to correct longer-term frequency drift of the clock pulses produced by clock 45.

Additional information of the BIU 32 can be found in U.S. Pat. No. 4,556,974. A more detailed description of the process control system 10 can be had by referring to U. S. Patent No. 4,607,256. Additional information of the individual, common, functional blocks of the physical modules can be had by reference to U.S. Pat. No. 4,709,347, all of the above-identified patents being assigned to the assignee of the present application; and additional information of the process controller 20' can be had by referencing U.S. Pat. No. 4,296,464.

The addition of an interface apparatus which interfaces other systems to the process control system 10 described above and a modification to a graphics generator in the US 122 opens up the existing system, specifically the graphics interface, which includes designing-in the capability to readily permit nodes of differing designs to communicate to the network. In order to open up the graphics interface such that a display which is not on the LCN can be displayed onto the CRT 151 of the US 122, there is included an interface to a graphics card of the US 122 from a co-processor. For more detailed information regarding the opening of the graphics interface, reference can be made to U.S. Pat. No. 5,386,503, entitled "Method for Controlling Window Displays in an Open Systems Windows Environment," and to U.S. Pat. No. 5,530,844, entitled "Method of Coupling Open Systems to a Proprietary Network," both Pat.s being assigned to the same assignee of the present application.

Figure 4:
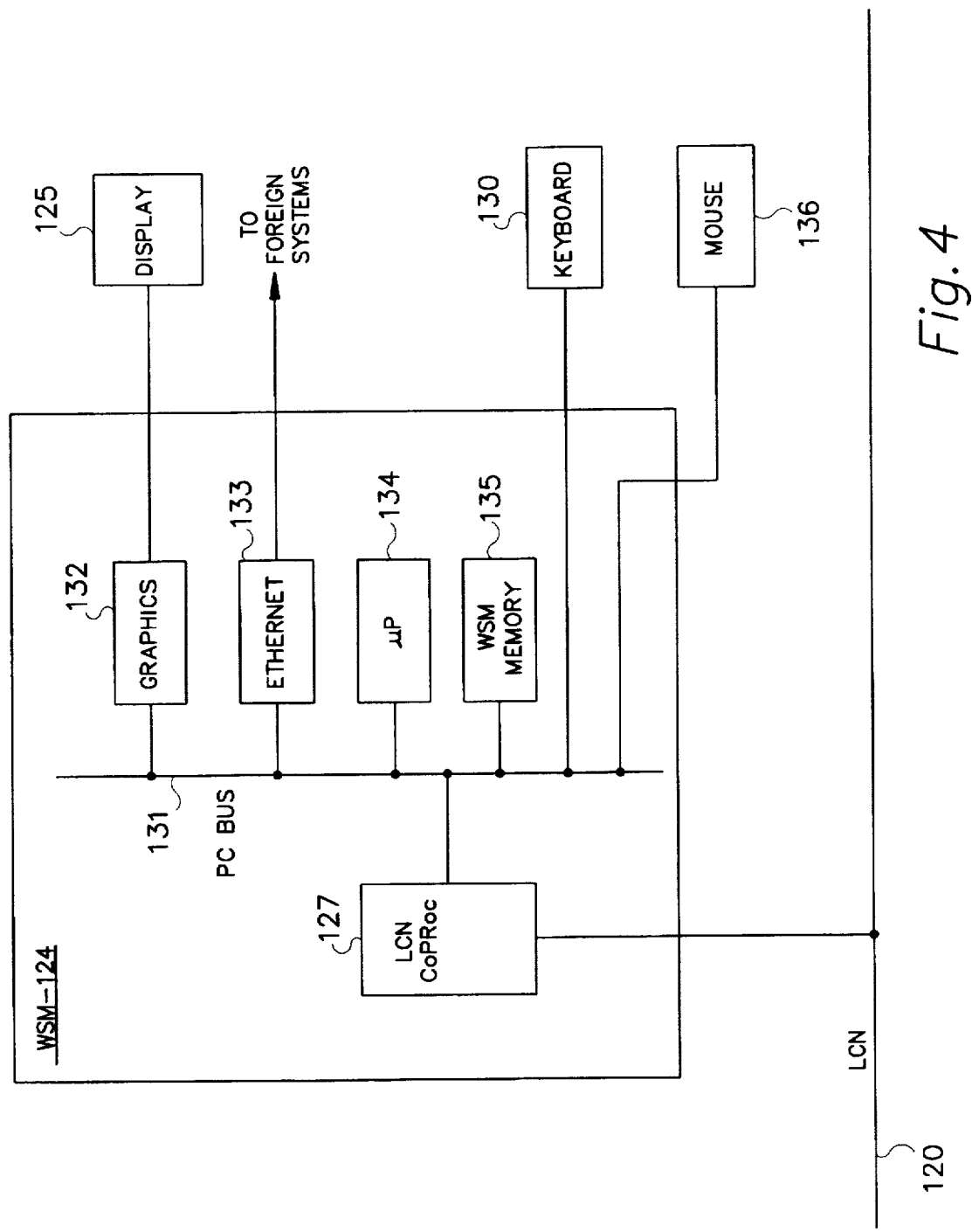
FIG. 4 shows a block diagram of a Workspace Manager Display System of the preferred embodiment.

The display system which incorporates the method of the present invention will now be described. Referring to FIG. 4, there is shown a block diagram of a Workspace Manager (WSM) Display System of the preferred embodiment. The Workspace Manager Display System, or more simply referred to as Workspace Manager 124, is coupled to the LCN 120 of the process control system 10 in the preferred embodiment. The Workspace Manager (WSM) 124 is a personal computer (PC) which be purchased in the marketplace, and includes an LCN co-processor 127 coupled to the LCN 120 and to an internal BUS (PCBUS) 131 of the PC (i.e., of the WSM 124). The LCN co-processor 127 includes the BIU 32, the module BUS 36, the module CPU 38, and the module memory 40, described above. This configuration permits the WSM 124 to communicate with the LCN 120 and the nodes connected thereto. The WSM 124 includes a graphics card 132 coupled to a display 125 and to the PC BUS 131. An Ethernet card 133 permits the WSM 124 to communicate with foreign systems (i.e., systems not coupled to the LCN 120). A microprocessor (µp) 134 of the PC is coupled to the PC BUS 131 and executes the Windows NT Operating System and the Workspace Manager software. A WSM memory 135 is also coupled to the PC BUS 131 and stores the various information (including a configuration file, which will be described later) for use by the µp 134. A keyboard 130 is included for inputting commands to the WSM 124. A mouse interface 136 is provided in the preferred embodiment of the WSM 124.

Figure 5:
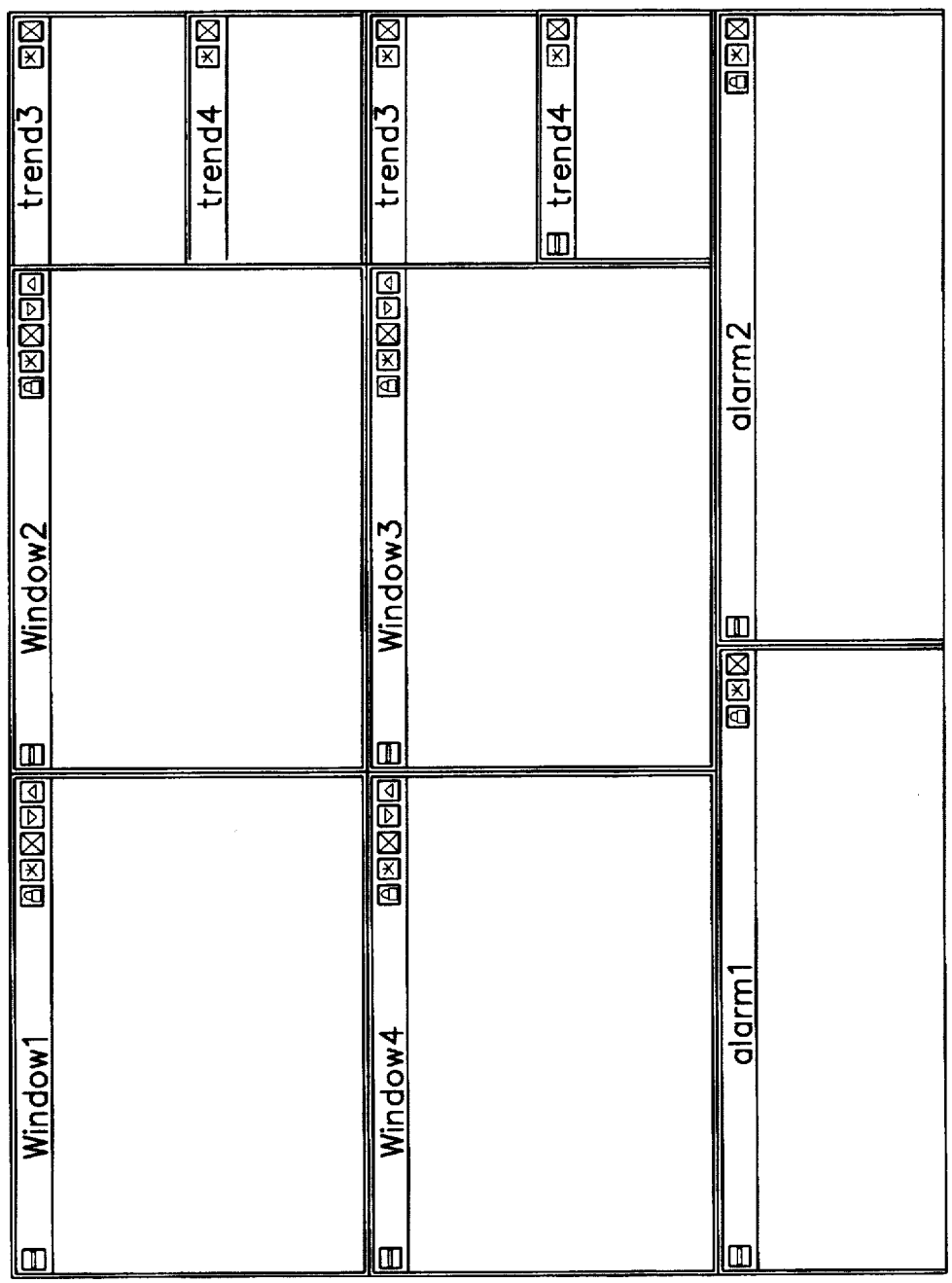
FIG. 5 shows the layout of an example configuration of a display of the Workspace Manager System (WSM), each window representing a different set of configured display characteristics, including but not limited to, the shown window locations and sizes.

In order to display a number of windows in an orderly, controlled manner, the display 125 is configured (or mapped) in a predetermined manner. Referring to FIG. 5, there is shown an example of a configuration of a display screen (sometimes referred to as a display surface) (not shown) of display 125 of WSM 124. The display screen (or workspace) is divided into three categories: schematics, trends, and alarms. This workspace is configured as follows:

Schematics are limited to the region in which the four initial windows are displayed.

Trends are positioned along the right side of the workspace in fixed locations.

Alarms are presented at the bottom of the display.

In the preferred embodiment, the schematic invocation never results in the removal of alarm or trend display and vice versa. In the title area, note that the normal windows functions, such as MIN, MAX . . ., features are included.

In the microprocessor 134 of WSM 124 there is operating a workspace management program (i.e., software) which in the preferred embodiment is a Windows NT, provided by the Microsoft Corp., which behavior has been modified as will be described herein under. In order to achieve the configuration as shown in FIG. 5, a window specification file (sometimes referred to as a configuration file) is provided to the workspace management software- The window specification is a set of window properties which can be applied to one or more real-application windows during runtime. Some of these properties, such as position, relate to existing windows concepts. Other properties, such as region and draggable, represent extended means of controlling application windows. A plurality of window specifications can be included in a given workspace configuration. At runtime, once the workspace manager associates a real-application window with a particular window specification, that specification's properties are applied and enforced for that application window. This will be further described herein under.

Figure 6:
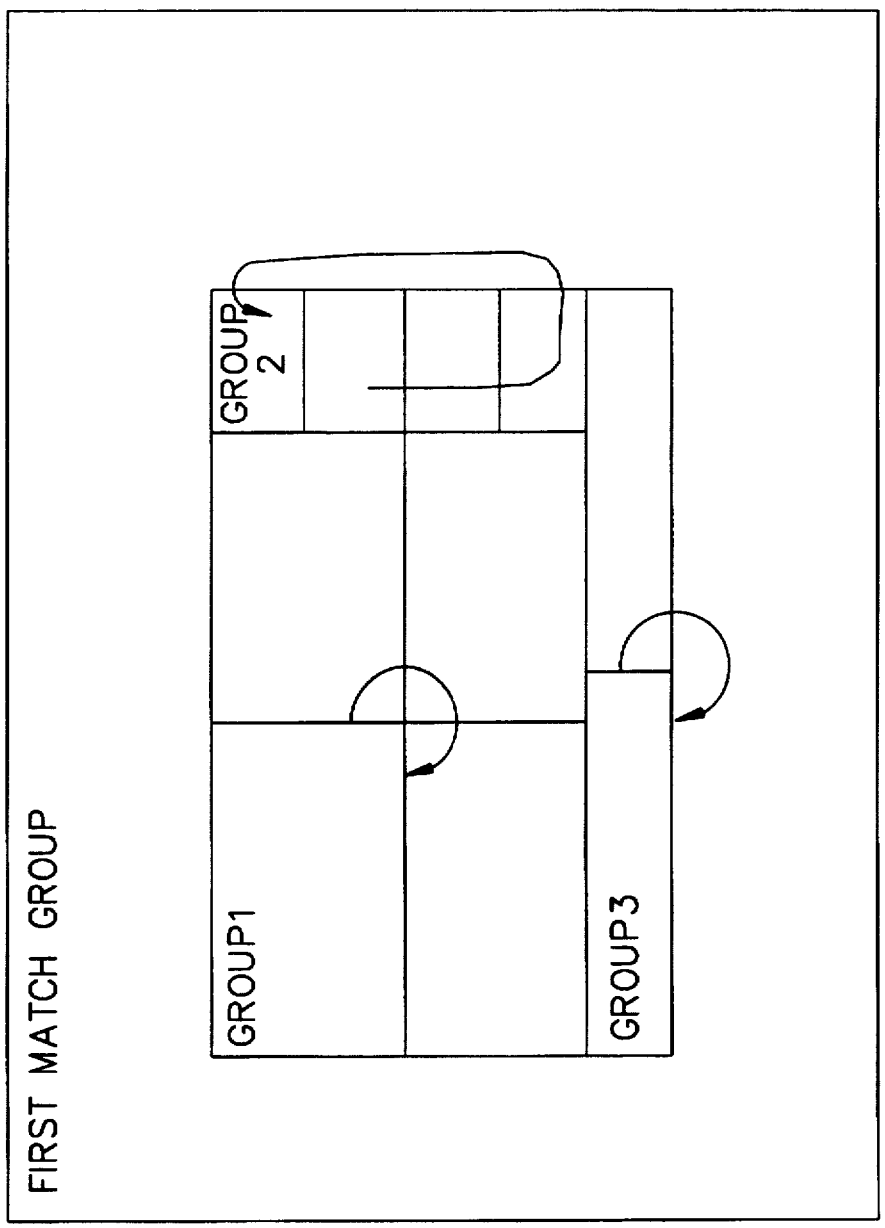
FIG. 6 shows an example ordering by which a newly-invoked application display area is related to a specific set of display characteristics for the example of FIG. 5.

In accordance with the examples shown above, FIG. 6 shows one example of how the display space is selected by the workspace manager program. The window specifications are organized into logical window groups for each workspace configuration. Each workspace configuration consists of a single top-level group, consisting of one or more window specifications, and/or subgroups. Thus, a hierarchy of window groupings is possible. Each window group must be configured with one of three possible strategies for searching the matching window specification. Each of these strategies embodies a unique approach to determining the criteria by which a given application display will be managed and providing a new kind of functionality which is included as part of this invention: The automatic replacement of existing displays by newly-invoked displays (determining which existing display is to be replaced with a newly invoked display). A round-robin group uses a "round robin" approach in selecting which of its window specifications is applied to a given application window. This group is intended to support a cyclical replacement style in which the newest application window appears to replace the oldest one. All window specifications of this type of group share a common match expression so that a similar set of applications can easily match to each window in a group. Therefore, the match expression concept is applied at the group level for the round-robin groups. A "manual-select" group is similar to the round-robin group in that all applications displayed in this group share a common match expression; however, this group does not automatically increment the window specification which should be used to manage the next application display which matches the group's match expression. Rather, the system allows the user to manually select where the next application display will appear, and all newly-invoked applications which belong to this group will continue to replace the manually-selected application until another application is manually selected. Applications are "selected" for replacement via special title-bar buttons which are included as part of this invention. The "first match" group is designed to search its list of subgroups and window specifications in a "top-down, depth-first" fashion. All items in this group, including individual window specifications, each have their own match expression. In the preferred embodiment, all three groups of the example of FIG. 5 are of the round-robin group type and is so indicated in the window specification file (or sometimes called herein configuration file).

Figure 7A:
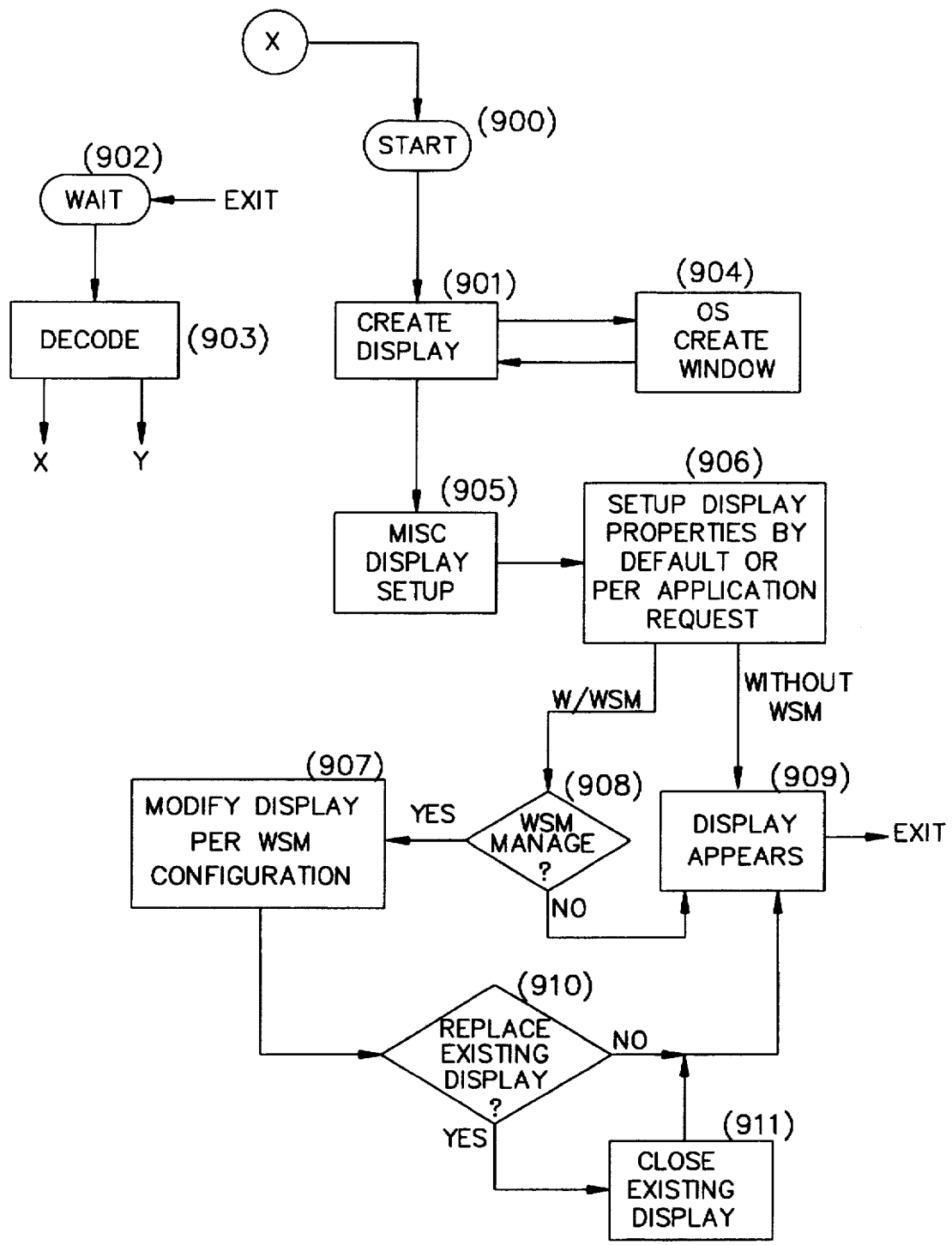
FIGS. 7A and 7B, shows a flow diagram of the WSM software operating in the Workspace Manager Display System in which the method of the present invention is utilized.
Figure 7B:
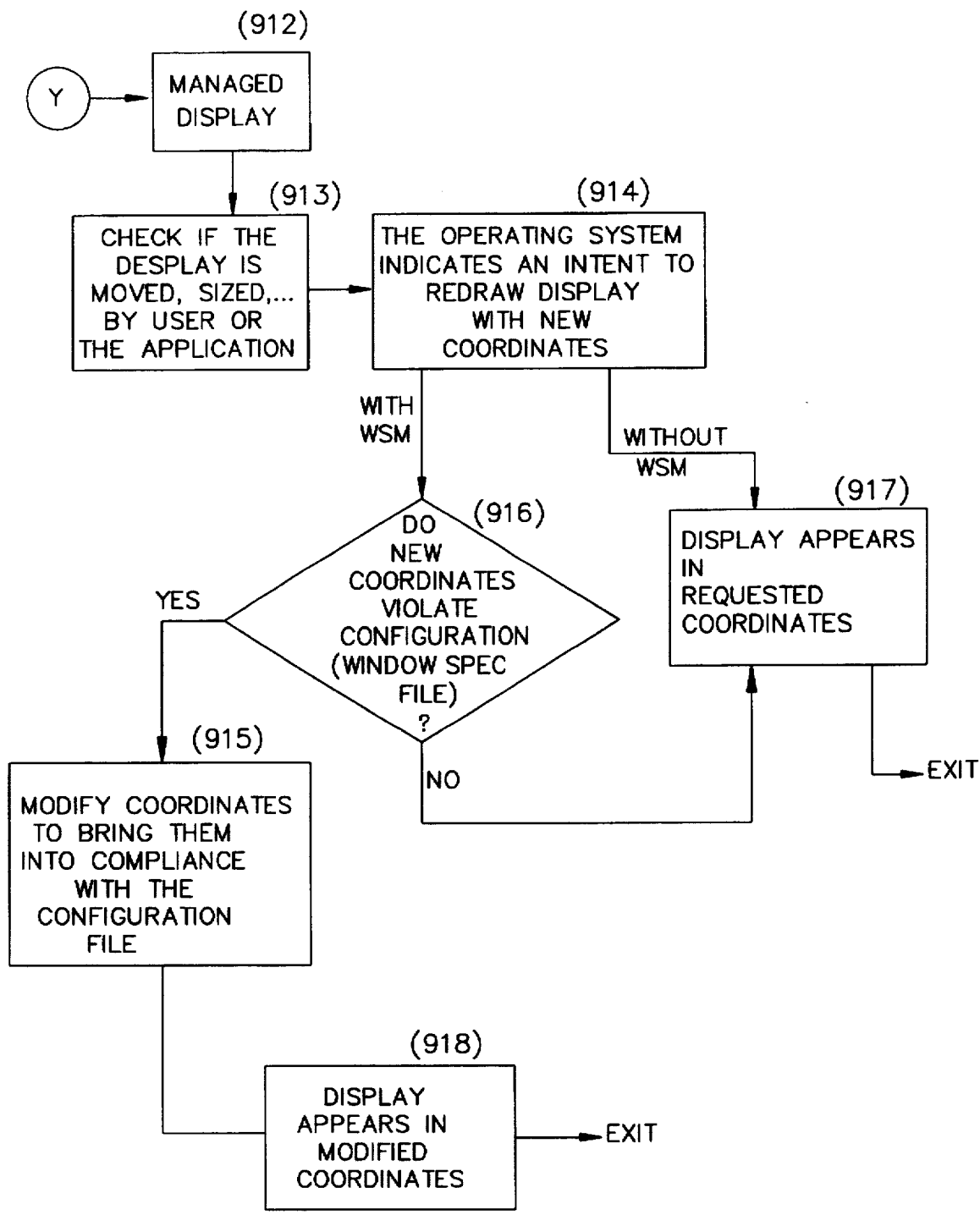

Referring to FIG. 7, which comprises FIGS. 7A and 7B, there is shown a flow diagram of the WSM software operating in the Workspace Manager Display System. A display of an application is requested via the keyboard 126 (or via a mouse interface with a corresponding display, not shown). The program operating within the Workspace Manager Display System 124 is essentially waiting for an input (Block 902). Once the input is received via the keyboard (or via the mouse), the message is decoded (Block 903) and branches to point X (Block 900) if a new display window of an application is requested (Block 900), or branches to point Y in FIG. 7B if display, not shown). The program operating within the Workspace Manager Display System 124 is essentially waiting for an input (Block 902). Once the input is received via the keyboard (or via the mouse), the message is decoded (Block 903) and branches to point X (Block 900) if a new display window of an application is requested (Block 900), or branches to point Y in FIG. 7B if a current display is being operated, on or being manipulated (Block 912). The requested display is created (Block 901) and the operating system creates the window which incorporates the requested display (Block 904). Within the window, any miscellaneous request made by the operator is also set up in the display (Block 905); and if no specific display parameters have been requested, default conditions will be utilized to set up the display (Block 906). If the workspace manager is not involved (i.e., is not to manage the display) or is inoperative or is optionally turned off, the display as requested and as set up appears on the display screen of the display 125 (Block 909), and the program exits to wait state (Block 902). If, however, the workspace manager is to control the display (Block 908), the display is modified in accordance with the workspace manager configuration file (or sometimes referred to herein as the window specification file) (Block 907). The configuration file is stored within the Workspace Manager Display System 124 and is generated offline and contains the parameters which define the workspace area of the display screen. In particular, the location on the display screen is modified such that the requested display appears in the next available window of the Window 1, Window 2, . . ., Trend 1, . . ., or Alarm 1 . . ., in the example of FIG. 5. If the requested display is to replace an existing display (Block 910), the existing display is closed (Block 911) and the program continues to Block 909, in which the display appears in the controlled format and within the controlled, predetermined area, and the program then exits to the wait loop. If an existing display is not to be replaced, the program branches immediately to Block 909, the display appears, and the program exits to Block 902. In the preferred embodiment of the present invention, provision exists for replacing an old display with a newly-requested display. However, it will be understood by those skilled in the art that many variations can be made with the replacement of a display, such as having a priority associated with the display whereby a display of a lower priority cannot replace a display of a higher priority. In addition, displays may be marked by an operator as not being replaceable, . It will be understood that many such features and variations thereof exist which are within the scope of the present invention.

If a display is being managed, i.e., operated on or modified (Block 912), the display is checked to determine if the operation is a move, size, stretch, . . . , being requested by the user or the application (Block 913). Before the application visually reflects the results of such an operation, the standard windows operating system (OS) of the WSM software signals its intent to redraw the display with the new coordinates (Block 914). If the display is being managed by the workspace manager, a determination is made whether the new coordinates violate the configuration file (the window specification file) (Block 916). If the coordinates are outside the configuration file, the coordinates are modified to bring them into compliance with the configuration file (Block 915). At Block 914, when the operating system redraws the display with the new coordinates and the display is not being managed by the workspace manager, the display appears in the requested coordinates (Block 917) and the program exits to the wait loop (Block 902). If the new coordinates in Block 916 do not violate the configuration file, the program proceeds to display the requested modified display in the requested coordinates (Block 917), and the program exits to the wait loop (Block 902). After the display modifies the coordinates in Block 915 to bring them into compliance with the configuration file, the display appears in the modified coordinates (Block 918) and the program exits to the wait loop (Block 902).

It will be recognized by those skilled in the art that the software of the workspace manager can be a completely new software package programmed to perform the functions as described in FIG. 7. Also, it will be recognized by those skilled in the art that the standard windows operating system (OS) can be utilized and modified in order to incorporate the features of the workspace manager display system as described herein. The window specification file, or configuration file, is a file stored within the WSM memory 135 of the WSM 124. There can be a plurality of configuration files to define various workspace configurations, including a four-window workspace; a five-window workspace, which is similar to a four-window workspace with the fifth workspace having a critical space (or group); a ten-window, three-group workspace, as shown in FIG. 5, . . . . . Each entry into the configuration file includes the size of the window, the position of the window, . . . , and/or other characteristics which define the parameters and properties of the window. Although the applications being displayed in the preferred embodiment are process-control related, it will be further understood by those skilled in the art that the application can be any application being monitored, e.g., financial applications when financial systems are being monitored, manufacturing plant operations when utilized in manufacturing operations, . . . .

In the preferred embodiment of the present invention, three (3) categories are identified above as schematics, trends, and alarms. Thus, the WSM software can differentiate between the kinds of displays permitting management of the workspace display area. A request to display a selected application display subsequently appears in one of the windows configured for the category associated with the selected application display. Thus, referring to the example of a display surface configuration of FIG. 5, a schematic category display appears in the Windows 1, 2, 3, or 4 area, a trend category display appears in the Trend 1, 2, 3, or 4 area, and an alarm category display appears in the Alarm 1 or 2 area, as will be described herein under.

Referring to FIG. 8, there is shown an example of an alarm display file, XYZ. This display file has been previously defined and stored on the WSM memory 135, or available to the WSM 124 via the LCN 120. The file name is included to identify the file; for this example, the file name is XYZ. The display "skeleton" is stored within the file, allowing room for inserting the applicable data during run time. The location of the data is identified. Also included is the category assigned to the file, thereby specifying the group in which the file is to be displayed. In this example the category is specified as an alarm (ALM) file (or display).

Figure 9:
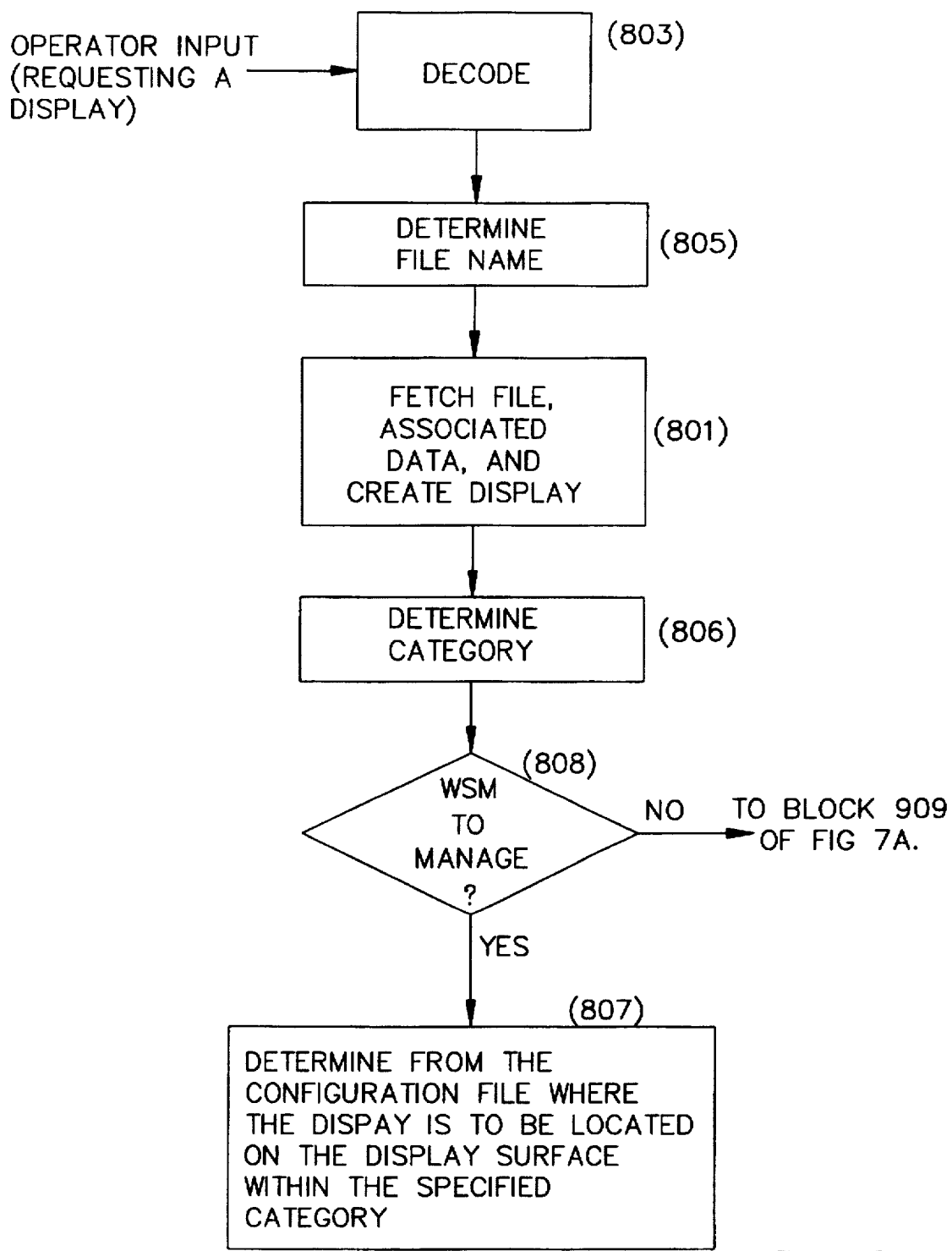
FIG. 9 shows a flow diagram of the category determination process of the preferred embodiment of the present invention.

The category determination process will now be described in conjunction with FIGS. 7 and 9. Referring to FIG. 9, there is shown a flow diagram of the category-determination process of the preferred embodiment of the present invention. Once an operator inputs a request to present an application display, the input is decoded (Block 803, also Block 903 of FIG. 7A), to determine the file that needs to be obtained (Block 805). The file is fetched along with the associated data and the display is created (Block 801, also Block 901 of FIG. 7A). The category is determined from the file data (Block 806) (or as an argument to invocation) and determined from a predetermined fist whether the WSM software is to manage the display of the requested file (Block 808, also Block 908 of FIG. 7A). From the configuration file, it is determined where the XYZ display is t o be presented within the alarms category (block 807, also Block 907 of FIG. 7A). In the example given here, file XYZ areas in the Alarm 1 area, or Alarm 2 area .

Referring to FIG. 10, there is shown an example of the configuration file. The example configuration file contains the three groups identified above: schematic, trend, and alarm. Each group is specified as a round-robin group, as discussed above in conjunction with FIG. 6, and is configured as shown in FIG. 5. In the example above, the XYZ file is an alarm (ALM) category. Once a match is made, the next available area is utilized to display the XYZ display. In this example, Alarm 1 area (reference FIG. 5) is used. The data (i.e., the display characteristics data), which include the position on the display surface, size of the display, and other characteristics, are used to position the requested display on the display surface. A pointer, $P_1$, is maintained by the WSM software to indicate the position to be utilized for the display. In this example, the next schematic display request (i.e., the next display having a schematics category) will be placed in the Window 3 area (reference FIG. 5), and the next trend display request will be placed in the Trend 2 area (reference FIG. 5), as indicated by the respective pointers $P_1$, $P_2$, and $P_3$. Thereby, the different categories of displays are organized and managed at runtime.

In the present invention, third-party applications can be dispositioned, not by category, but by title and process file (i.e., monitor). In the match expression in the configuration file, the expression to handle third-party applications can include:

MATCH=CAT ("ALM") or TITLE ("WORD") or MODULE ("SYSTEM").

Thus, any title that has "WORD" included in its title, or the word "SYSTEM" in its path name, is managed by the WSM software. If there is no match in the configuration file, then it is not managed by the WSM software. Third-party applications can be managed by category but the display of the third-party soft ware must be launched by the WSM software upon a command to the WSM software and indicate a category to associate with the third-party software, is not managed by the WSM software. Third-party applications can be managed by category but the display of the third-party software must be launched by the WSM software upon a command to the WSM software and indicate a category to associate with the third-party software.

While there has been shown what is considered the preferred embodiment of the present invention, it will be manifest that many changes and modifications can be made therein without departing from the essential scope and spirit of the invention. It is intended, therefore, in the annexed claims to cover all such changes and modifications that fall within the true scope of the invention.

What is claimed is:

1. A method of controlling a computer window display of a display system having a display surface of one or more physical screens, the method providing an integrated workspace wherein multiple applications are displayed in a specific coordinated and predetermined area of the display surface in accordance to the category of display, comprising the steps of:

a) creating an application display in response to a request inputted to the display system;

b) determining the category of the requested display;

c) finding a match between the category of the requested display and an entry in a configuration file, the configuration file defining display characteristic, including position and size, by category, of predetermined display windows specified for the category of the requested display;

d) when a match is determined, selecting an available display window of predetermined display windows, from the configuration file, and creating data to position the requested display window within the specific area of display surface associated with the category of display.

2. A method of controlling a computer window display according to claim 1, where in the step of finding a match comprises the steps of:

a) searching the configuration file to obtain the match parameter;

b) comparing the match parameter to the category of the requested display;

c) when a match is found,
      i) proceeding to step d) of claim 1; otherwise
      ii) repeating step a) of claim 2 until the entire configuration file i s searched.

3. A method of controlling a computer window display according to claim 1, wherein the step of creating an application display comprises the steps of:

a) decoding the request inputted;

b) fetching a display file corresponding to the requested input; and c) obtaining the data required by the display file to create the application display.

4. A method of controlling a computer window display of a display system having a display surface of one or more physical screens, the method providing an integrated workspace wherein multiple applications are displayed in a specific coordinated and predetermined area of the display surface in accordance to the category of display, comprising the steps of:

a) receiving a request for display in accordance to an operator input, the request including a file name and associated data;

b) retrieving a display file responsive to the file name;

c) creating an application display in response to said display file and associated data;

d) determining the category of the requested display;

e) finding a match between the category of the requested display and an entry in a configuration file, the configuration file defining display characteristic, including position and size, by category, of predetermined display windows specified for the category of the requested display; and f) when a match is determined, selecting an available display window of predetermined display windows, from the configuration file, and creating data to position the requested display window within the specific area of display surface associated with the category of display.

* * * * *